United States Patent [19]
Hibino et al.

[11] Patent Number: 5,457,668
[45] Date of Patent: Oct. 10, 1995

[54] DATA PROCESSING SYSTEM WITH COLLATING PROCESSING AT START UP FOR DETERMINING THE PRESENCE OF AN IMPROPER OPTICAL CD

[75] Inventors: Toshiro Hibino; Sagahiro Taho, both of Kyoto, Japan

[73] Assignee: Nintendo Co., Ltd., Kyoto, Japan

[21] Appl. No.: 107,844

[22] PCT Filed: Dec. 21, 1992

[86] PCT No.: PCT/JP92/01677

§ 371 Date: Aug. 25, 1993

§ 102(e) Date: Aug. 25, 1993

[87] PCT Pub. No.: WO93/13476

PCT Pub. Date: Jul. 8, 1993

[30] Foreign Application Priority Data

Dec. 27, 1991 [JP] Japan .................................... 3-359809

[51] Int. Cl.⁶ .................................................. G11B 17/22
[52] U.S. Cl. ................................. 369/32; 369/53; 369/58; 380/4; 340/825.34
[58] Field of Search .................................. 369/32, 83, 84, 369/53, 54, 58; 300/13, 15; 395/100, 153, 154, 275, 425; 380/4, 18; 340/825.31, 825.34

[56] References Cited

U.S. PATENT DOCUMENTS 4,462,076  7/1984  Smith, III ..................................... 380/4
5,134,391  7/1992  Okada ................................... 340/825.34

FOREIGN PATENT DOCUMENTS

| | | |
|---|---|---|
| 61-36842 | 2/1986 | Japan . |
| 61-206035 | 9/1986 | Japan . |
| 67-226837 | 10/1986 | Japan . |
| 62-222345 | 9/1987 | Japan . |
| 1-274239 | 11/1989 | Japan . |
| 2-210562 | 8/1990 | Japan . |
| 3-121525 | 5/1991 | Japan . |
| 3-266051 | 11/1991 | Japan . |

*Primary Examiner*—Frank Gonzalez
*Assistant Examiner*—Tan Dinh
*Attorney, Agent, or Firm*—Nixon & Vanderhye

[57] ABSTRACT

Various data required for a game as well as first collating music data are recorded on a CD-ROM (4). On the other hand, second collating music data and collating program data are stored in a ROM (302) in an external memory cartridge (3). A CPU (101a) executes collating program data at the time of starting a system, thereby to collate the first collating music data read out from the CD-ROM (4) and the second collating music data read out from the ROM (302) and allow the execution of a game program recorded on the CD-ROM (4) only when the data coincide with each other as a result of the collation.

10 Claims, 14 Drawing Sheets

DATA PROCESSING SYSTEM WITH COLLATING PROCESSING AT START UP FOR DETERMINING THE PRESENCE OF AN IMPROPER OPTICAL CD

TECHNICAL FIELD

The present invention relates generally to a data processing system, and more particularly, to a data processing system so adapted as to perform predetermined collating processing at the time of starting the system to judge the adaptability of an optical information recording medium serving as an external memory.

BACKGROUND ART

As represented by, for example, a television game set and a personal computer, a data processing system so adapted as to read out program data (game program data in the case of the television game set) from an external memory and execute the same to display a predetermined image on a monitor device (for example, a CRT and a liquid crystal display device) and output a sound thereto has been conventionally known.

In such a data processing system, the program data stored in the external memory should not be data unfairly copied. If the program data stored in the external memory is data unfairly copied, the profit of an owner of the copyright of the program data is damaged. In addition, if the program data unfairly copied is inferior in quality, a malfunction occurs in the data processing system, so that the profit of a user purchasing the external memory is damaged. Consequently, the program data must be strictly prevented from being unfairly copied.

As a method of preventing program data from being unfairly copied, the following methods have been conventionally known.

A first method is a method disclosed in U.S. Pat. No. 4,462,076 issued on Jul. 24, 1984. This method is a method of previously storing a character or character data representing an owner of the copyright in both a memory in a main unit and a memory in an external cartridge, comparing both the data, merely displaying data representing an owner of the copyright by a character if both the data coincide with each other and then, starting the execution of a game program.

A second method is a method disclosed in Japanese Patent Laid-Open Gazette No. 210562/1990 laid open on Aug. 21, 1990. This method is a method of previously storing first character data for displaying a trademark in an external memory unit and storing second character data corresponding to the first character data in an internal memory in an information processing unit, displaying the first character data on a monitor device when the external memory unit is mounted on the information processing unit, and collating the first and second character data to allow the execution of program data if both the data coincide with each other.

A third method is a method disclosed in Japanese Patent Laid-Open Gazette No. 296433/1986 laid open on Dec. 27, 1986 and Japanese Patent Laid-Open Gazette No. 3331/1987 laid open on Jan. 9, 1987. This third method is a method of respectively providing an information processing unit and an external storage with ICs for checking the adaptability of the external storage and establishing data communication between both the ICs to judge the adaptability of the external storage.

The first method is very complicated because the data representing an owner of the copyright stored in the memory in the main unit must be altered for each exchange of the external cartridge. Furthermore, in the first method, after the data representing an owner of the copyright stored in the memory in the main unit and the data representing an owner of the copyright stored in the memory in the external cartridge coincide with each other, the data representing an owner of the copyright is displayed on a monitor device. When both the data do not coincide with each other, therefore, nothing is displayed on the monitor device. Consequently, the first method gives a user a feeling of uneasiness that the television game set itself develops a fault when both the data do not coincide with each other.

The second method uses as collating data the character data for displaying a trademark. Therefore, the necessity of altering the collating data in the memory in the main unit for each exchange of the external memory unit as in the first method is eliminated. In the second method, however, a collating program executed by a CPU in the information processing unit is stored in a ROM in the information processing unit. Consequently, the second method has the disadvantage in that it cannot be carried out with respect to a game apparatus containing no ROM for storing such a collating program. The first method has the same disadvantage.

Furthermore, in the first and second methods, image data is used as collating data. Accordingly, the first and second methods have also the disadvantages in that the amount of data such as collating data and collating program data is increased, and time required for collating processing becomes long.

In the third method, the ICs for checking the adaptability of the external storage must be provided for both the information processing unit and the external storage. When an optical information recording medium (for example, a CD-ROM) on which data is so recorded as to be optically readable is used as the external storage, however, it is impossible to provide such a checking IC for the optical information recording medium. Furthermore, the third method has the disadvantage in that it cannot be carried out with respect to a game apparatus containing no checking IC, similarly to the first and second methods.

Therefore, an object of the present invention is to provide a data processing system which is available to check the adaptability of an optical information recording medium, can be applied to an information processing unit or an image processing unit which store no collating program already sold, and can prevent the appearance of an unfair optical information recording medium by making only an adaptable optical information recording medium usable.

DISCLOSURE OF THE INVENTION

The present invention provides a data processing system, relevantly provided for a monitor device for displaying an image upon receipt of an image signal and outputting a sound upon receipt of a sound signal, for executing predetermined collating processing at the time of starting the system and judging the adaptability of an optical information recording medium serving as an external memory, comprising an optical information recording medium on which at least first collating music data, sound data, and image data are so recorded as to be optically readable, optical reproducing means for reading out the respective recorded data from the optical information recording medium, second collating music data storing means for storing second collating music data having a predetermined relationship with the first collating music data, collating program storing means for storing collating program data, image/sound processing program storing means for storing image/sound processing program data for image processing and sound processing, image/sound processing program executing means for executing the image/sound processing program data stored in the image/sound processing program data storing means to generate a sound signal and an image signal based on the sound data and the image data recorded on the optical information recording medium and apply the signals to the monitor device, collating program executing means for executing the collating program data stored in the collating program storing means at the time of starting the system, to collate the first collating music data read out from the optical information recording medium by the optical reproducing means and the second collating music data stored in the second collating music data storing means to judge whether or not both the data have the predetermined relationship and allow an operation based on the image/sound processing program data by the image/sound processing program executing means only when both the data have the predetermined relationship, and sound signal generating means for generating a collating music signal on the basis of the first collating music data read out by the optical reproducing means to apply the same to the monitor device at the time of starting the system.

In the data processing system according to the present invention, the first collating music data read out from the optical information recording medium and the second collating music data stored in the second collating music data storing means are collated, to allow the execution of an inherent operation based on a program only when both the data have the predetermined relationship, thereby to make it possible to make only a proper optical information recording medium as an object of use. In addition, the music data is used as collating data, thereby to make it possible to perform the collating processing with a smaller amount of data and at higher speed, as compared with a conventional system using image data as collating data. Furthermore, the first collating music data read out from the optical information recording medium is converted into a collating music signal and the collating music signal is outputted as a sound from the monitor device at the time of starting the data processing system, so that a user knows the result of the collating processing after confirming that the data processing system is normally operated. Even if the result of the collation is noncoincidence, therefore, the user is not given a feeling of uneasiness. In addition, it is also possible to exclude an improper optical information recording medium as an infringement of the music copyright of collating music.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1:
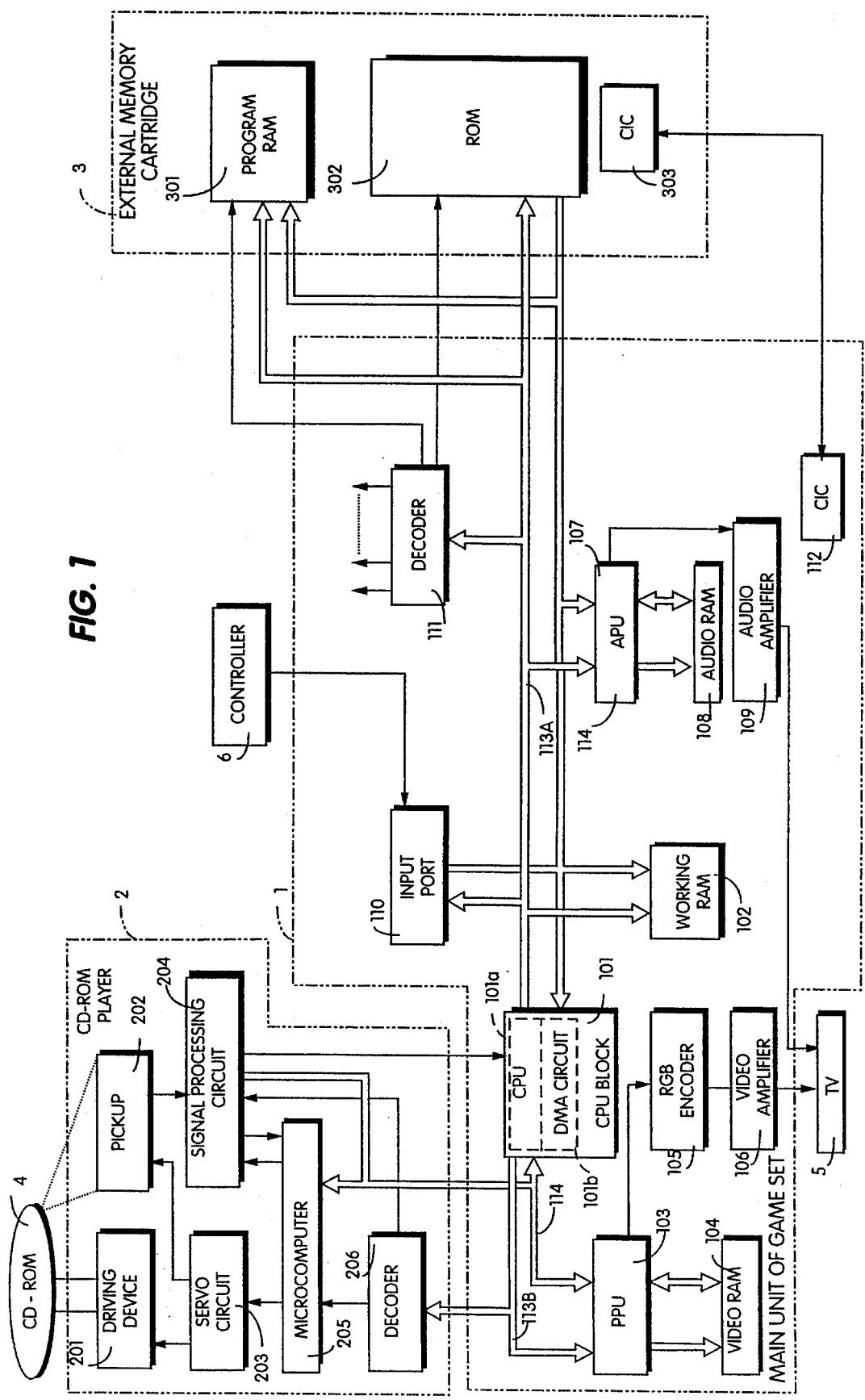
FIG. 1 is a block diagram showing the construction according to a first embodiment of the present invention.

FIG. 1 is a block diagram showing the construction according to a first embodiment of the present invention. A data processing system according to the present embodiment is constructed as such a television game system as to display a character for a game on a monitor device and output a sound (music, a sound effect or the like) for a game thereto in accordance with program data read out from an external memory.

In FIG. 1, the present embodiment comprises a main unit of a game set (hereinafter merely referred to as a game set) 1, a CD-ROM player (hereinafter merely referred to as a player) 2, and an external memory cartridge 3. The player 2 is selectively connected to the game set 1 through a connecting code which is not shown. The external memory cartridge 3 is detachably mounted on the game set 1. The external memory cartridge 3 is electrically connected to the game set 1 through a connector which is not shown when it is mounted on the game set 1.

The player 2 is for reproducing recorded data from a CD-ROM 4 serving as an external memory, and comprises a driving device 201, a pickup 202, a servo circuit 203, a signal processing circuit 204, a microcomputer 205, and a decoder 206.

Figure 4:
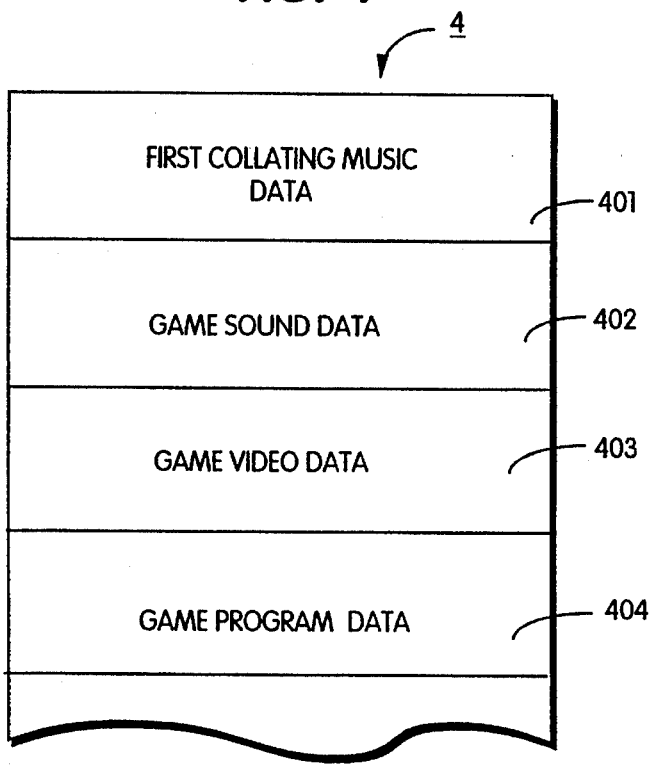
FIG. 4 is an illustration showing a memory map of a CD-ROM shown in FIG. 1.

The CD-ROM 4 is an external memory having a large capacity of, for example, 500 M bytes, and is detachably mounted on the player 2. As shown in FIG. 4, the CD-ROM 4 comprises a plurality of storage areas, and first collating music data 401, game sound data 402, game video (image) data 403, and program data 404 for game processing are so recorded in the respective storage areas as to be optically readable. The image data out of the various data has the largest capacity, and the first collating music data has a slight capacity required to make music for approximately several seconds to several ten seconds.

The first collating music data 401 includes at least sound data corresponding to not less than four to eight measures so as to be recognized as a musical work which is to be an object of the copyright. The game sound data 402 includes music for a game and a sound effect for a game (for example, a sound at the time of movement of a character and attack by the character). As a method of recording the first collating music data 401 and the game sound data 402, various methods are considered. In the present embodiment, the following recording method has been adopted. Specifically, each of the first collating music data 401 and the game sound data 402 includes reference tone-color data and a parameter. The reference tone-color data includes data representing a plurality of waveforms (for example, a sine wave, a square wave, and a triangular wave) corresponding to the tone-colors of a plurality of types of musical instruments. The parameter includes for each note interval (pitch) data and sound length data representing the length of the note. A sound such as music or a sound effect is produced by changing the frequency of the waveform data on the basis of the interval data and changing a time period during which the waveform data is generated on the basis of the sound length data. The respective data shown in FIG. 4 are EFM (Eight to Fourteen Modulation)-modulated and recorded on the CD-ROM 4.

The game video data 403 includes various character data. The game program data 404 includes various program data required for game processing.

The driving device 201 is for rotating the CD-ROM 4. The pickup 202 irradiates a recording track of the CD-ROM 4 by light (for example, laser light) and detects its reflected light (or its transmitted light), thereby to read recorded data from the recording track. Data is recorded in the form of, for example, a train of pits on the recording track of the CD-ROM 4. The servo circuit 203 carries out feedback control of the rotational speed of the driving device 201 and the displacement of the pickup 202, thereby to carry out control for tracking and focusing. The signal processing circuit 204 is for demodulating the data read by the pickup 202 to the original data. The microcomputer 205 is for controlling the operations of the servo circuit 203 and the signal processing circuit 204. The decoder 206 is for decoding address data applied from a CPU block 101 in the game set 1. A decoded signal outputted from the decoder 206 is applied to the signal processing circuit 204 and the microcomputer 205.

The game set 1 comprises a CPU block 101, a working RAM 102, a picture processing unit (hereinafter referred to as a PPU) 103, a video RAM 104, an RGB encoder 105, a video amplifier 106, an audio processing unit (hereinafter referred to as an APU) 107, an audio RAM 108, an audio amplifier 109, an input port 110, a decoder 111, and a checking IC (hereinafter referred to as a CIC) 112.

The CPU block 101 comprises a central processing unit (hereinafter referred to as a CPU) 101a and a direct memory access (hereinafter referred to as DMA) circuit 101b. The DMA circuit 101b is a circuit for controlling DMA transfer of data. It is well-known that the DMA transfer is a mode for releasing the right to occupy a data bus from the control of the CPU 101a to transfer data at high speed. The working RAM 102 is a working memory for temporarily storing data processed by the CPU 101a.

The PPU 103 is a circuit for processing image data applied from the CPU 101a and converting the same into an RGB signal. The video RAM 104 is a memory for storing image data corresponding to one frame for displaying a still picture character serving as a background picture. The RGB encoder 105 is a circuit for converting the RGB signal applied from the PPU 103 into a composite video signal. The video amplifier 106 is a circuit for current-amplifying the composite video signal applied from the RGB encoder 105. An output signal of the video amplifier 106 is applied to a television receiver 5 serving as a monitor device.

The APU 107 is a circuit for converting sound data applied from the CPU block 101 into an analog sound signal. The audio RAM 108 is a working memory for temporarily storing data required for processing performed by the APU 107. The audio amplifier 109 is a circuit for current-amplifying the analog sound signal outputted from the APU 107. An output signal of the audio amplifier 109 is applied to the television receiver 5.

A controller 6 is connected to the input port 110. The controller 6 is operated by a player so as to instruct the switching of modes and the movement of a character. An output signal of the controller 6 is applied to the CPU 101a through the input port 110.

The decoder 111 is a circuit for decoding address data applied from the CPU 101a. A decoded signal outputted from the decoder 111 is applied to the working RAM 102, and a program RAM 301 and a ROM 302 in the external memory cartridge 3.

The CIC 112 performs judgment processing of the adaptability of the external memory cartridge 3 in cooperation with a CIC 303 in the external memory cartridge 3.

An A address bus 113A, a B address bus 113B, and a data bus 114 are connected to the CPU block 101. Address data outputted to the A address bus 113A from the CPU block 101 is applied to the working RAM 102, the APU 107, the input port 110, the decoder 111, the program RAM 301 and the ROM 302. Address data outputted to the B address bus 113B from the CPU block 101 is applied to the PPU 103 and the decoder 206. The CPU block 101 is connected to the PPU 103, the signal processing circuit 204, the microcomputer 205, the working RAM 102, the APU 107, the input port 110, the program RAM 301 and the ROM 302 through a data bus 114.

Figure 5:
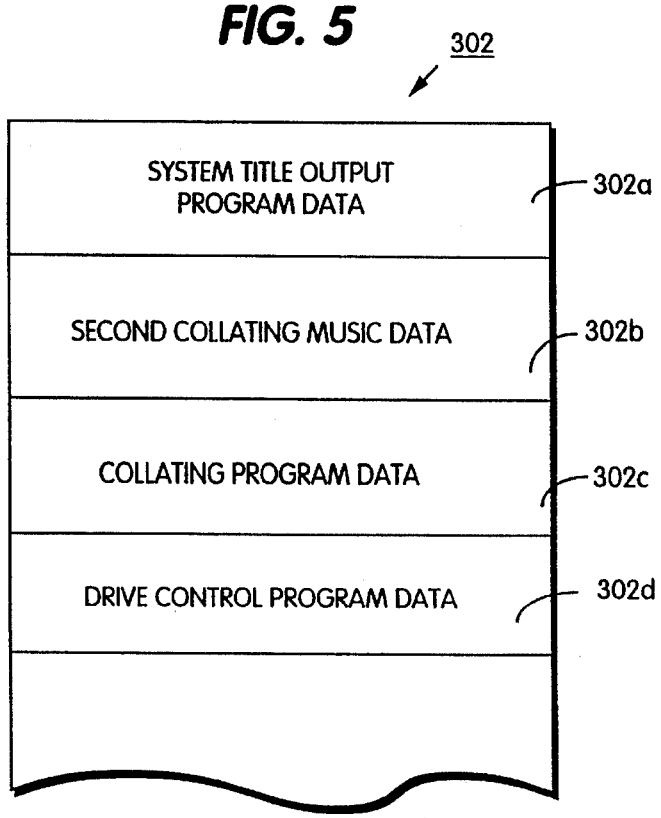
FIG. 5 is an illustration showing a memory map of a ROM in an external memory cartridge shown in FIG. 1.

The external memory cartridge 3 comprises the program RAM 301, the ROM 302, and the CIC 303. The ROM 302 stores in a nonvolatile manner system title output program data 302a, second collating music data 302b, collating program data 302c and drive control program data 302d, as shown in FIG. 5.

The system title output program data 302a includes program data and display data for displaying at the time of starting the data processing system the title of the system on the television receiver 5.

The second collating music data 302b is data having a predetermined relationship with the above described first collating music data 401. More specifically, the second collating music data 302b includes only a parameter out of the reference tone-color data and the parameter included in the first collating music data 401. Although the parameter includes the interval data and the sound length data as described above, the second collating music data 302b includes interval data and/or sound length data corresponding to the parameter included in the first collating music data 401. Consequently, in collating processing as described later, the interval data and/or the sound length data included in the first collating music data 401 and the second collating music data 302b are collated.

The collating program data 302c includes various program data required for the collating processing. The drive control program data 302d includes program data for controlling the operation of the player 2 in reading out the recorded data from the CD-ROM 4.

The program RAM 301 is a memory for temporarily storing the system title output program data 302a, the collating program data 302c and the drive control program data 302d which are read out from the ROM 302. The CIC 303 performs judgment processing of the adaptability of the external memory cartridge 3 in cooperation with the CIC 112 in the game set 1.

Figure 2:
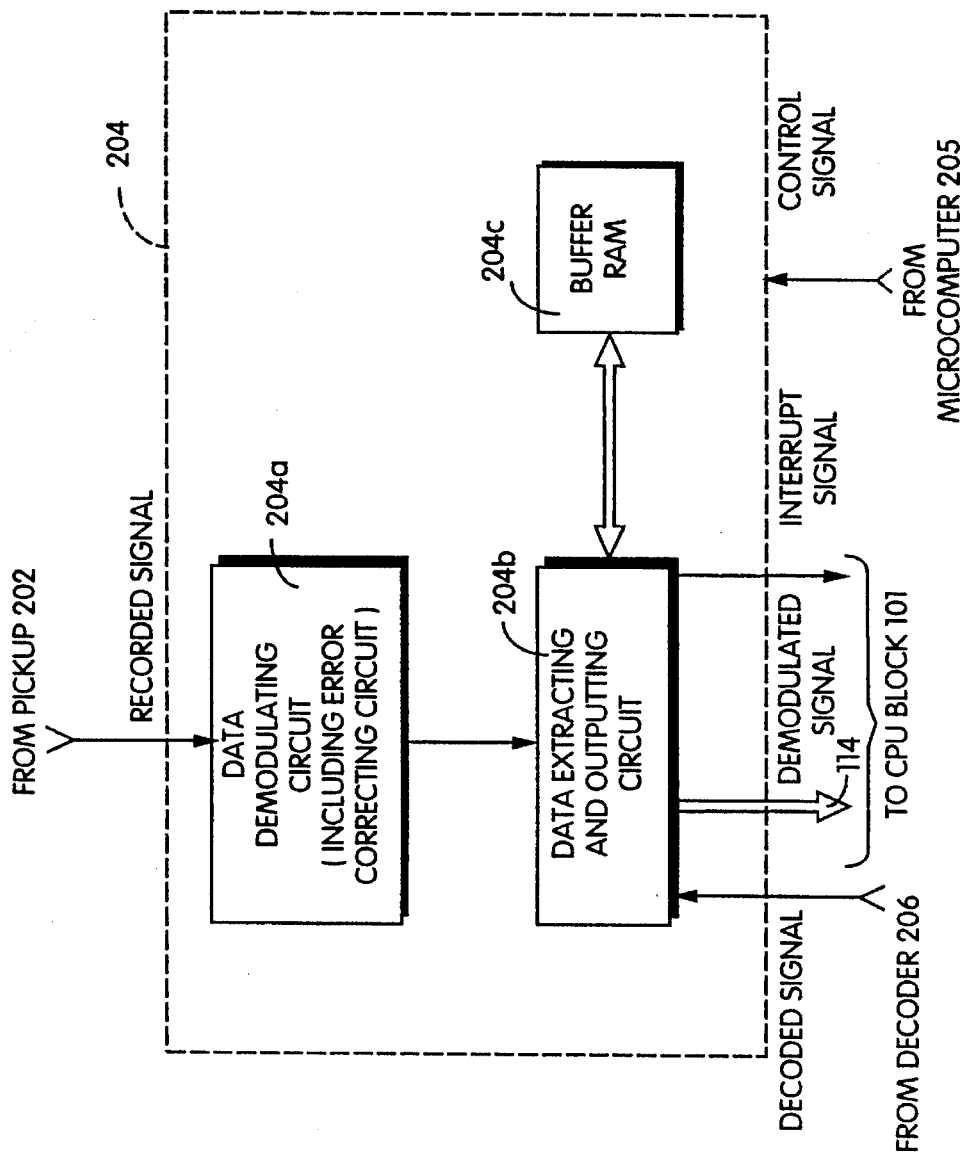
FIG. 2 is a block diagram showing the more detailed construction of a signal processing circuit shown in FIG. 1.

FIG. 2 is a block diagram showing the more detailed construction of the signal processing circuit 204 shown in FIG. 1. In FIG. 2, the signal processing circuit 204 comprises a data demodulating circuit 204a, a data extracting and outputting circuit 204b, and a buffer RAM 204c. The recorded signal read from the CD-ROM 4 by the pickup 202 is applied to the data demodulating circuit 204a. The data demodulating circuit 204a demodulates the recorded signal which is EFM-modulated, and corrects an error in data. An output of the data demodulating circuit 204a is applied to the data extracting and outputting circuit 204b. The data extracting and outputting circuit 204b is a circuit for converting the format of demodulated data applied from the data demodulating circuit 204a. Specifically, the data extracting and outputting circuit 204b converts the data recorded in a particular format on the CD-ROM 4 into data having a format which can be processed by the CPU 101a. The buffer RAM 204c is a memory for temporarily storing the data processed by the data extracting and outputting circuit 204b. The data extracting and outputting circuit 204b outputs an interrupt signal when demodulated data whose amount is not less than a predetermined amount is loaded into the buffer RAM 204c. This interrupt signal is applied to the CPU block 101 as a signal for requesting to transfer data. The decoded signal from the decoder 206 is applied to the data extracting and outputting circuit 204b. This decoded signal is activated when the CPU block 101 requests the signal processing circuit 204 to output the demodulated data. The data extracting and outputting circuit 204b outputs the demodulated data stored in the buffer RAM 204c to the data bus 114 in response to the fact that this decoded signal is enabled.

Figure 3:
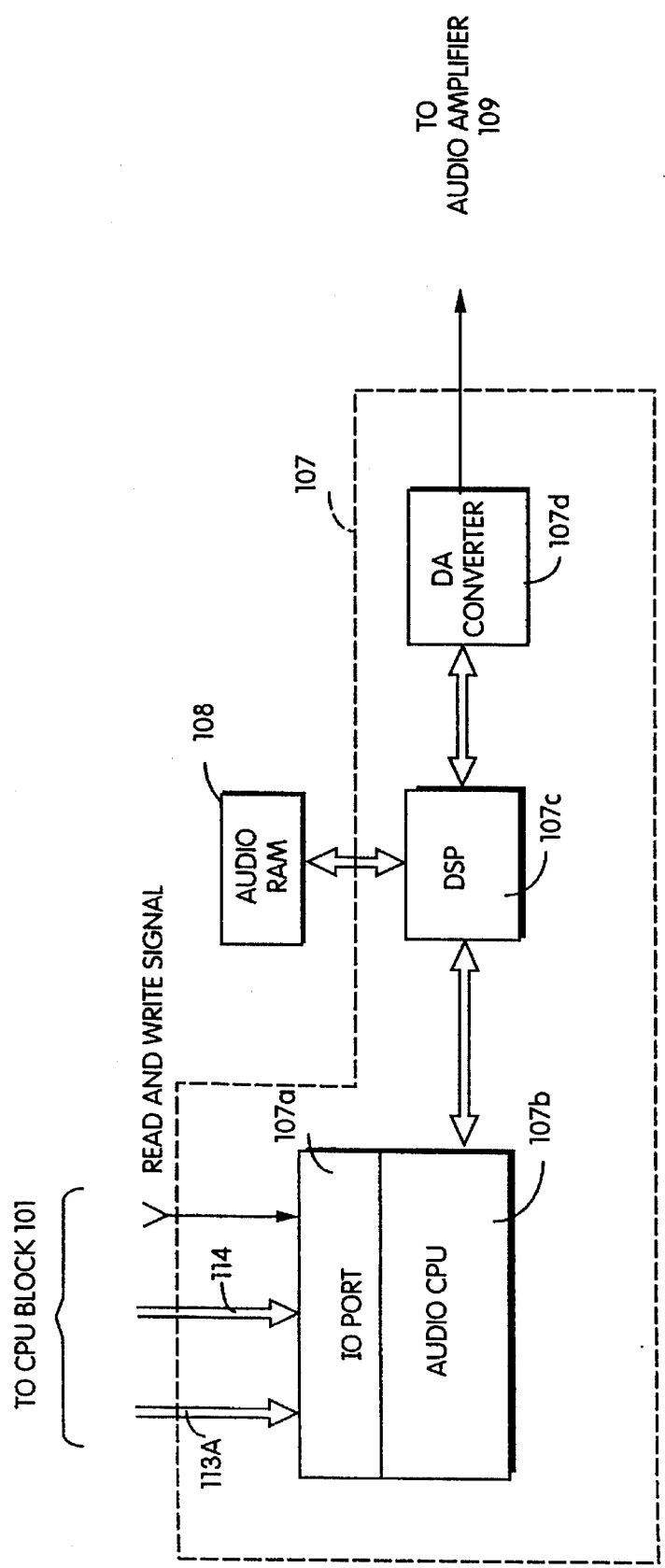
FIG. 3 is block diagram showing the more detailed construction of an APU shown in FIG. 1.

FIG. 3 is a block diagram showing the more detailed construction of the APU 107 shown in FIG. 1. In FIG. 3, the APU 107 comprises an IO port 107a, an audio CPU 107b, a digital signal processor (hereinafter referred to as a DSP) 107c, and a digital-to-analog converter 107d. The audio CPU 107b is connected to the A address bus 113A and the data bus 114 through the IO port 107a. In addition, a read and write signal is applied to the audio CPU 107b from the CPU block 101. The audio CPU 107b executes a sound processing program applied from the CPU 101a, thereby to control timing at which a sound signal is generated and control an interface between the CPU 101a and the APU 107. The DSP 107c is a circuit for converting the format of sound data inputted from the audio CPU 107b. Specifically, the DSP 107c converts the sound data recorded in a particular format on the CD-ROM 4 into the original sound data. When the DSP 107c converts the format of the data, the audio RAM 108 is used as a working memory. Digital sound data outputted from the DSP 107c is converted into an analog sound signal by the digital-to-analog converter 107d. An output of the digital-to-analog converter 107d is applied to an audio amplifier 109.

Figure 6:
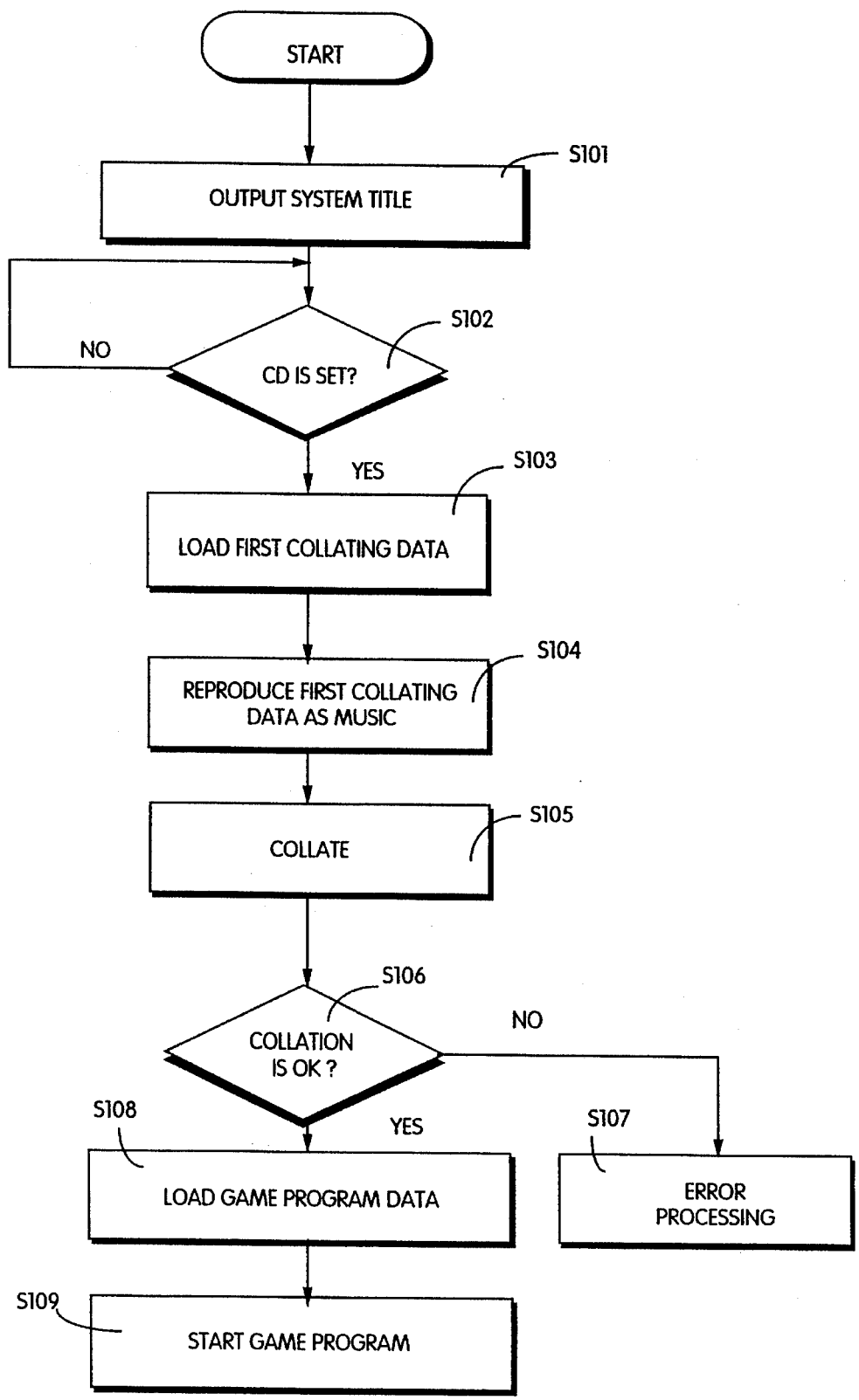
FIG. 6 is a flow chart showing operations performed by a CPU shown in FIG. 1 at the time of starting a system.
Figure 7:
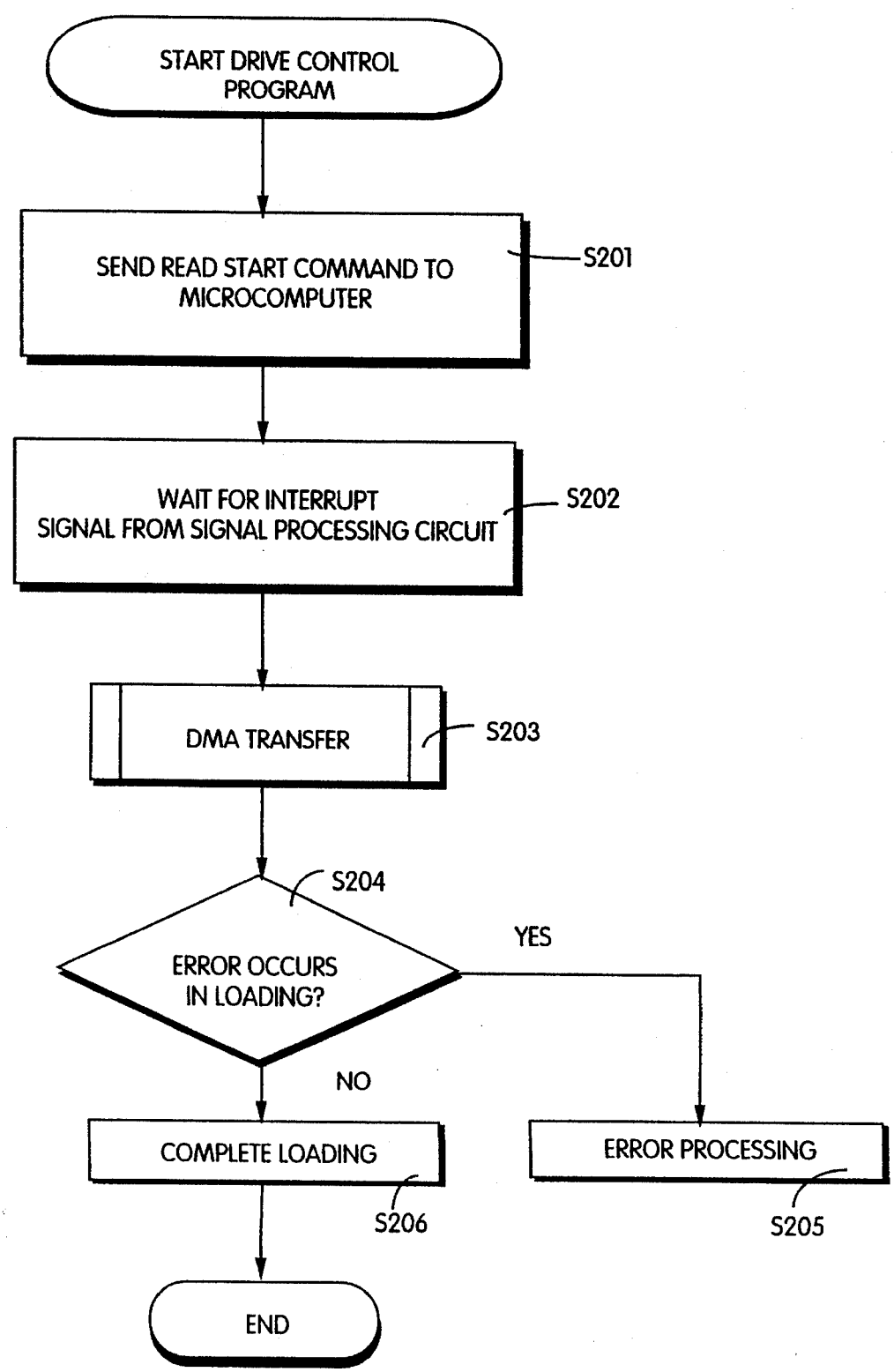
FIG. 7 is a flow chart showing operations performed by the CPU shown in FIG. 1 in executing a drive control program.
Figure 8:
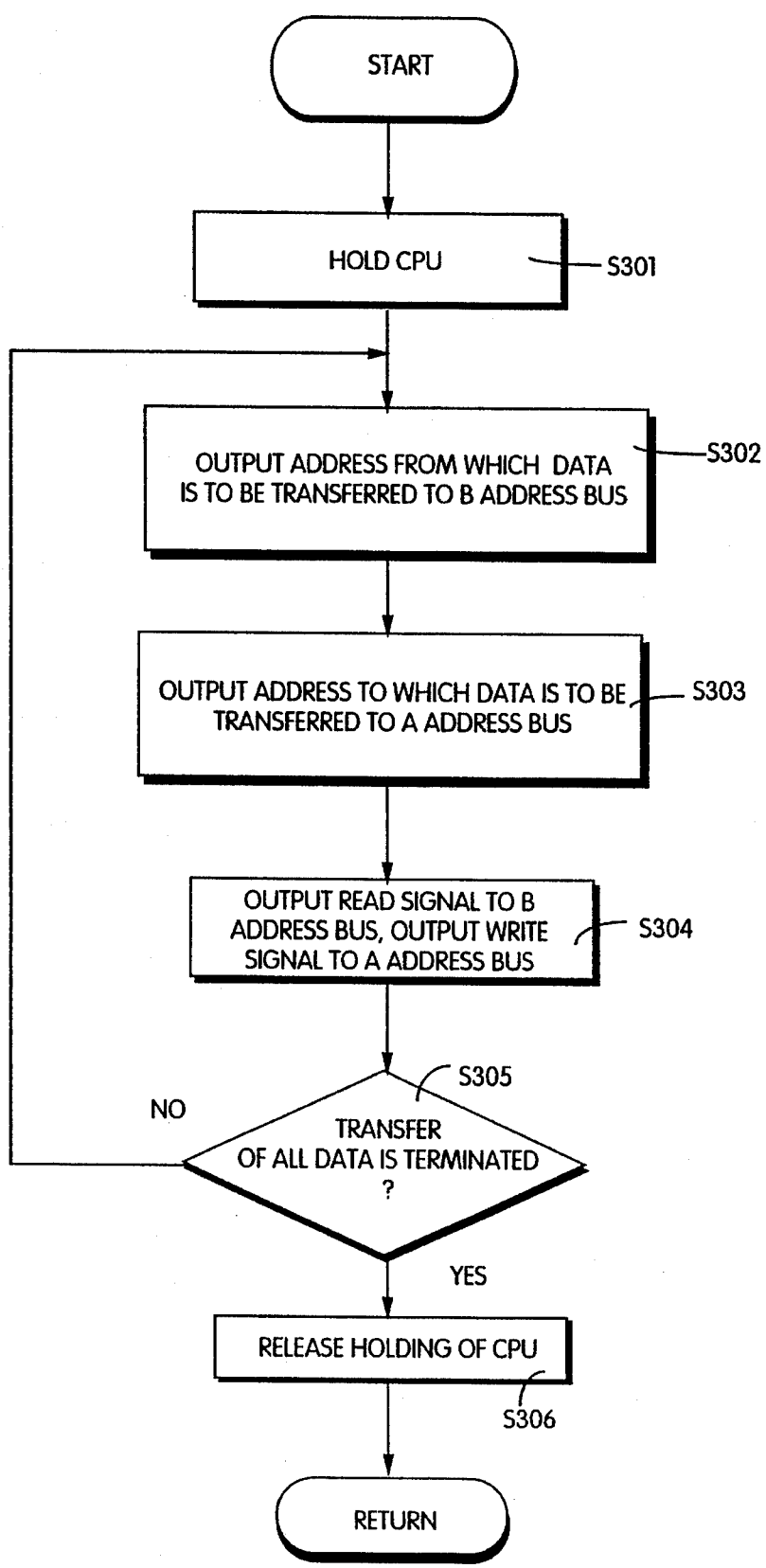
FIG. 8 is a flow chart showing operations performed by a DMA circuit shown in FIG. 1 in executing a DMA transfer subroutine shown in FIG. 7.
Figure 9:
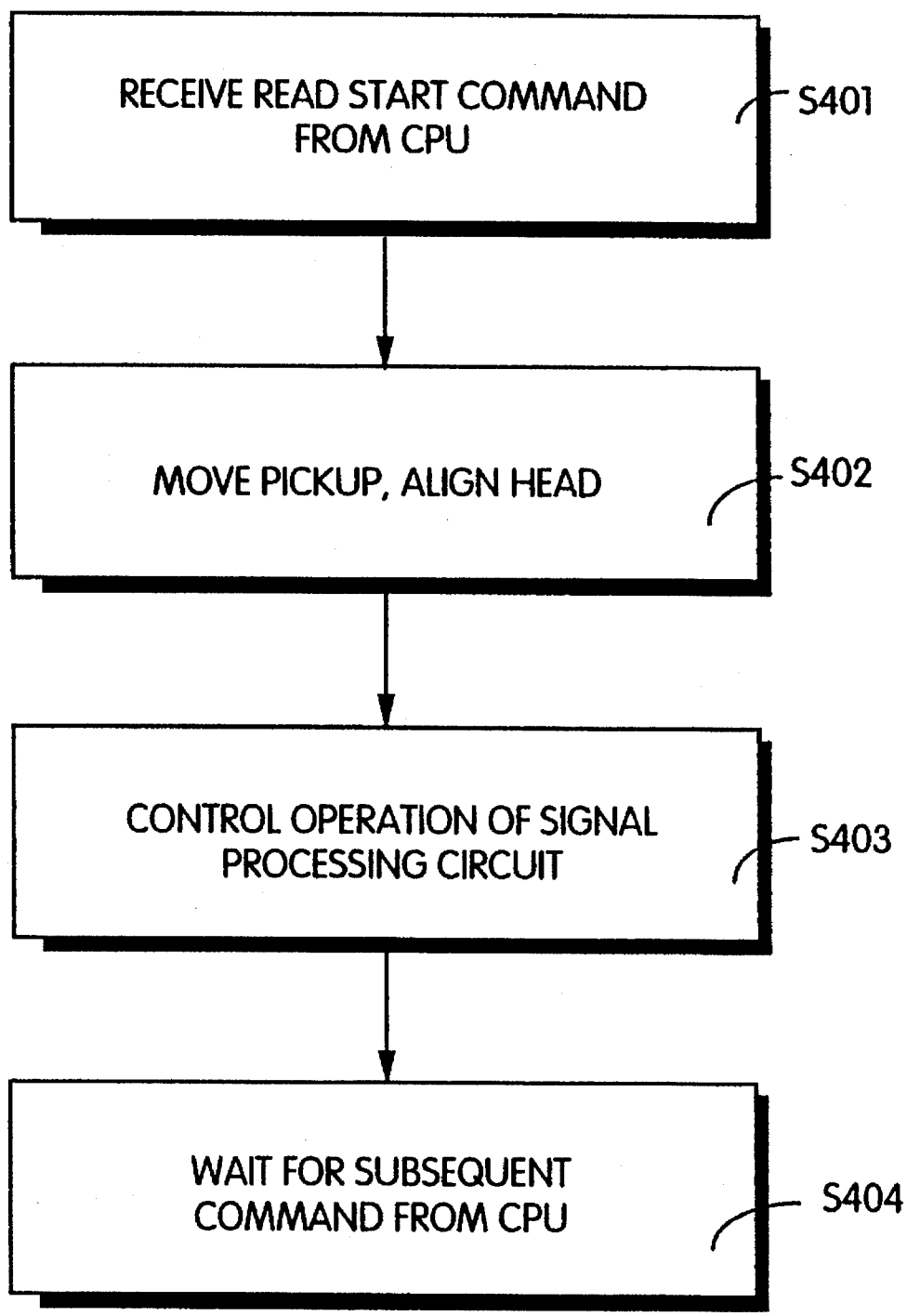
FIG. 9 is a flow chart showing operations performed by a microcomputer shown in FIG. 1 in receiving a read start command from the CPU.

FIG. 6 is a flow chart showing operations performed by the CPU 101a at the time of starting the system. FIG. 7 is a flow chart showing operations performed by the CPU 101a in executing the drive control program data 302d shown in FIG. 5. FIG. 8 is a flow chart showing operations performed by the DMA circuit 101b in carrying out a subroutine step S203 for DMA transfer shown in FIG. 7. FIG. 9 is a flow chart showing operations performed by the microcomputer 205 in receiving a read start command from the CPU 101a. Referring now to FIGS. 6 to 9, description is made of the operations according to the embodiment shown in FIGS. 1 to 3.

Referring now to FIG. 6, description is made of operations performed by the CPU 101 at the time of starting the system. When the data processing system shown in FIG. 1 is started (for example, the power supply is turned on), the CPU 101a reads out the collating program data 302c (see FIG. 5) from the ROM 302 and performs the following operations.

First, in the step S101, the CPU 101a reads out the system title output program data 302a shown in FIG. 5 from the ROM 302, generates system title image data for an initial screen in accordance with the system title output program data and output the same to the PPU 103. The PPU 103 converts the applied system title image data into an RGB signal and outputs the RGB signal to the RGB encoder 105. The RGB encoder 105 converts the applied RGB signal into a composite video signal. This composite video signal is current-amplified in the video amplifier 106 and then, is outputted to the television receiver 5. Consequently, the title of the system serving as an initial screen is displayed on the television receiver 5.

The program then proceeds to the step S102. In the step S102, the CPU 101a judges whether or not the CD-ROM 4 is mounted on the player 2. If it is judged that the CD-ROM 4 is mounted, the program proceeds to the step S103.

In the step S103, the CPU 101a controls the player 2, to read out the first collating music data 401 (see FIG. 4) from the CD-ROM 4 and load the same in the working RAM 102. In the operation shown in the step S103, the drive control program data 302d stored in the ROM 302 is read out and executed. The drive control program will be described with reference to FIGS. 7 and 8.

The program then proceeds to the step S104. The CPU 101a performs processing for reproducing the first collating music data loaded in the working RAM 102 as music. Specifically, the CPU 101a reads out the first collating music data loaded in the working RAM 102 and transfers the same to the APU 107. In the APU 107, the applied first collating music data is accepted by the audio CPU 107b and is applied to the DSP 107c. The DSP 107c converts the format of the applied first collating music data into a format which can be reproduced as a music signal and outputs the data obtained by the format conversion to the digital-to-analog converter 107d. The digital-to-analog converter 107d converts the first collating music data after the format conversion into an analog sound signal and outputs the analog sound signal.

The analog sound signal outputted from the digital-to-analog converter 107d is current-amplified by the audio amplifier 109 and then, is applied to the television receiver 5. Consequently, first collating music is outputted from a speaker of the television receiver 5. As a result, a user recognizes that the data processing system is normally operated. Meanwhile, the game sound data 402, the video data 403 and the program data 404 for game processing which are stored in the CD-ROM 4 have a large amount, while the audio RAM 108, the video RAM 104 and the working RAM 102 have a significantly small storage capacity. Accordingly, the respective data 402 to 404 are transferred in several times, thereby to realize game processing. Consequently, respective parts, which are used at given time after starting the game, of the game sound data 402, the video data 403 and the program data 404 which are stored in the CD-ROM 4 are transferred to the audio RAM 108, the video RAM 104 and the working RAM 102 in parallel with output of the collating music. Therefore, the user can wait until data transfer is completed while listening to music, thereby to make it possible to prevent the user from being bored and irritated.

The program then proceeds to the step S105. In the step S105, the CPU 101a performs a collating operation of the first collating music data loaded in the working RAM 102 and the second collating music data 302b (see FIG. 5) stored in the ROM 302. As described above, the first collating music data comprises reference tone-color data (tone-color data for each musical instrument) and musical interval and sound length data serving as a parameter. On the other hand, the second collating music data includes interval data or sound length data for collating music or both the interval data and the sound length data. Consequently, in the step S105, any one of collating operations of only the interval data, only the sound length data, and both the interval data and the sound length data is performed. However, such a collating method is a mere example. It is needless to say that another collating method can be adopted. For example, the first collating music data corresponding to not less than 16 measures may be stored, to compare the first collating music data and the second collating music data with each other with respect to interval data and/or sound length data corresponding to most characteristic four to eighth measures out of not less than 16 measures, and compare the first collating music data and the second collating music data with each other with respect to only interval data and/or sound length data in the N-th beat (N=1 to 4 in a 4/4 time signature) corresponding to the other measures. In addition, when one note is stored without being divided into interval data and sound length data, for example, when music data is PCM-recorded on the CD-ROM 4, the first collating music data and the second collating music data may be compared with each other with respect to a sampling frequency and PCM music data to be compared for each predetermined cycle.

The program then proceeds to the step S106. The CPU 101a judges whether or not the first collating music data and the second collating music data coincide with each other as a result of the collating processing in the step S105. If both the data do not coincide with each other, the program proceeds to the step S107. In the step S107, the CPU 101a executes error processing. As manners of the error processing, various manners are considered. For example, a message indicating that the CD-ROM 4 is not a proper product may be displayed on the television receiver 5 or a sound indicating that the CD-ROM 4 is not a proper product may be outputted thereto immediately after it is judged that both the data do not coincide with each other. In addition, the CPU 101a may read out only a head portion of the game program data 404 from the CD-ROM 4 and executes the same and thereafter, may inhibit the game program data from being read out. In other words, the CPU 101a may perform such processing as to warn a user that the CD-ROM 4 is an improper product. Such error processing is performed, thereby to make it possible to inhibit an unfairly imitated CD-ROM on which no predetermined music data is recorded from being used. Specifically, if an operation of reading out data from the CD-ROM 4 is inhibited or an operation of writing data read out from the CD-ROM 4 to the video RAM 104 and/or the working RAM 102 is inhibited, it is possible to inhibit the game from proceeding to a next screen after overflow of the storage capacity of the RAM. As a result, the user or player loses in his interest in the game, and the user does not purchase such a CD-ROM unfairly imitated. Therefore, it is possible to prevent an imitated product from overflowing. Furthermore, as the other error processing, any one or combinations of the CPU block 101, the PPU 103, and the APU 107 may be disabled, or may be all disabled.

In the step S106, if it is judged that both the data coincide with each other, the program proceeds to the step S108. In the step S108, the CPU 101a controls the player 2, to read out the game program data 404 from the CD-ROM 4 and load the same into the program RAM 301. In the operation shown in the step S108, the drive control program data 302d stored in the ROM 302 is read out and executed. The drive control program will be described in detail with reference to FIGS. 7 and 8.

The program then proceeds to the step S109. In the step S109, the CPU 101a starts the execution of the game program data loaded in the program RAM 301.

Referring now to FIGS. 7 and 8, operations performed in accordance with the drive control program in the steps S103 and S104 shown in FIG. 6 will be described.

First, in the step S201 shown in FIG. 7, the CPU 101a sends a read start command to the microcomputer 205 in the player 2. The microcomputer 205 performs operations shown in FIG. 9 in response to this read start command.

In the step S401 shown in FIG. 9, the microcomputer 205 which received the read start command from the CPU 101a performs the following operations. First, in the step S402, the pickup 202 is moved to the recording track on which the first collating music data is recorded, and a reading head (included in the pickup 202) is aligned with the CD-ROM 4 for focusing control and tracking control.

The program then proceeds to the step S403. In the step S403, the microcomputer 205 controls the operation of the signal processing circuit 204. Consequently, processing timing of a data demodulating operation and an error correcting operation in the data demodulating circuit 204a and processing timing of a format converting operation in the data extracting and outputting circuit 204b are controlled. At this time, a recorded signal outputted from the pickup 202 is subjected to demodulation and error correction in the data demodulating circuit 204a and then, the format thereof is converted in the data extracting and outputting circuit 204b. The demodulated data after the format conversion is temporarily stored in the buffer RAM 204c by the data extracting and outputting circuit 204b. If the amount of the demodulated data stored in the buffer RAM 204c is not less than a predetermined amount, the data extracting and outputting circuit 204b activates an interrupt signal to the CPU block 101.

The program then proceeds to the step S404. In the step

S404, the microcomputer 205 waits until the subsequent command is applied from the CPU 101a.

Referring to FIG. 7 again, the CPU 101a waits until the interrupt signal from the signal processing circuit 204 in the player 2 is activated the step S202. As described above, the signal processing circuit 204 activates the interrupt signal if the amount of the demodulated data stored in the buffer RAM 204 shown in FIG. 2 is not less than a predetermined amount, and requests that the demodulated data is transferred to the CPU 101a.

If the interrupt signal from the signal processing circuit 204 is activated, the program proceeds to the step S203. In the step S203, processing is transferred from the CPU 101a to the DMA circuit 101b. The DMA circuit 101b DMA-transfers the demodulated data to the working RAM 102 or the program RAM 301 from the signal processing circuit 204 and loads the demodulated data therein. The details of processing in the subroutine shown in the step S203 will be described later with reference to FIG. 8.

The program then proceeds to the step S204. In the step S204, the CPU 101a judges whether the demodulated data DMA-transferred is loaded without errors in the working RAM 102 or the program RAM 301. When an error occurs, the program proceeds to the step S205. In the step S205, the CPU 101a executes error processing. On the other hand, if no error occurs, the program proceeds to the step S206. In the step S206, the CPU 101a completes the load processing of the demodulated data.

Referring now to FIG. 8, the details of the processing in the subroutine in the step S203 shown in FIG. 7 will be described.

First, in the step S301, the DMA circuit 101b stops the operation of the CPU 101a. Consequently, the right to occupy the data bus 114 is released from the control of the CPU 101a.

The program then proceeds to the step S302. In the step S302, the DMA circuit 101b outputs to the B address bus 113B data representing an address from which data is to be transferred (data representing a port address in the signal processing circuit 204). This address data is applied to the decoder 206, to be decoded. A decoded signal outputted from the decoder 206 is applied to the microcomputer 205. Correspondingly, the microcomputer 205 brings the signal processing circuit 204 into a data output enable state.

The program then proceeds to the step S303. In the step S303, the DMA circuit 101b outputs to the A address bus 113A data representing an address to which data is to be transferred. This address data is applied to a memory to which data is to be transferred (the working RAM 102 or the program RAM 301), to designate an address in the memory.

The program then proceeds to the step S304. In the step S304, the DMA circuit 101b outputs a read signal to the B address bus 113B, and outputs a write signal to the A address bus 113A. The read signal outputted to the B address bus 113B is applied to the decoder 206, to be decoded. At this time, the decoder 206 applies the decoded signal requesting to start the transfer of the demodulated data to the data extracting and outputting circuit 204 in the signal processing circuit 204. The data extracting and outputting circuit 204b outputs the demodulated data stored in the buffer RAM 204c to the data bus 114 in response to this decoded signal. On the other hand, the write signal outputted to the A address bus 113A is applied to the decoder 111, to be decoded. At this time, the decoder 111 outputs the decoded signal allowing writing to the memory to which data is to be transferred. Consequently, the memory to which data is to be transferred enters a writable state. The demodulated data outputted to the data bus 114 from the data extracting and outputting circuit 204b in the signal processing circuit 204 is transferred to the memory to which data is to be transferred (the working RAM 102 or the program RAM 301) directly through the CPU 101a, to be loaded therein. This data transfer is performed, for example, one byte at a time (for example, 8 bits at a time).

The program then proceeds to the step S305. In the step S305, the DMA circuit 101b judges whether or not the transfer of all data is terminated. If the transfer of the data is not terminated, the program is returned to the above described step S302, so that the same operations in the above described steps S302 to 304 are repeated. On the other hand, if the transfer of all data is terminated, the program proceeds to the step S306. In the step S306, the DMA circuit 101b releases the stop of the operation of the CPU 101a. Consequently, the data bus 114 falls under the control of the CPU 101a again.

In the embodiment shown in FIGS. 1 to 3, data communication is established between the CIC 112 and the CIC 303 at the time of starting the system, and it is also judged whether or not the external memory cartridge 3 is a proper product. In the above described embodiment, therefore, double check is so made as to prevent unfair copying, thereby to prevent unfair copying almost completely. The construction and the operations of the CIC 112 and the CIC 303 are disclosed in detail in Japanese Patent Laid-Open Gazette Nos. 296433/1986 and 3331/1987 and hence, the description thereof is omitted in the specification.

Figure 10:
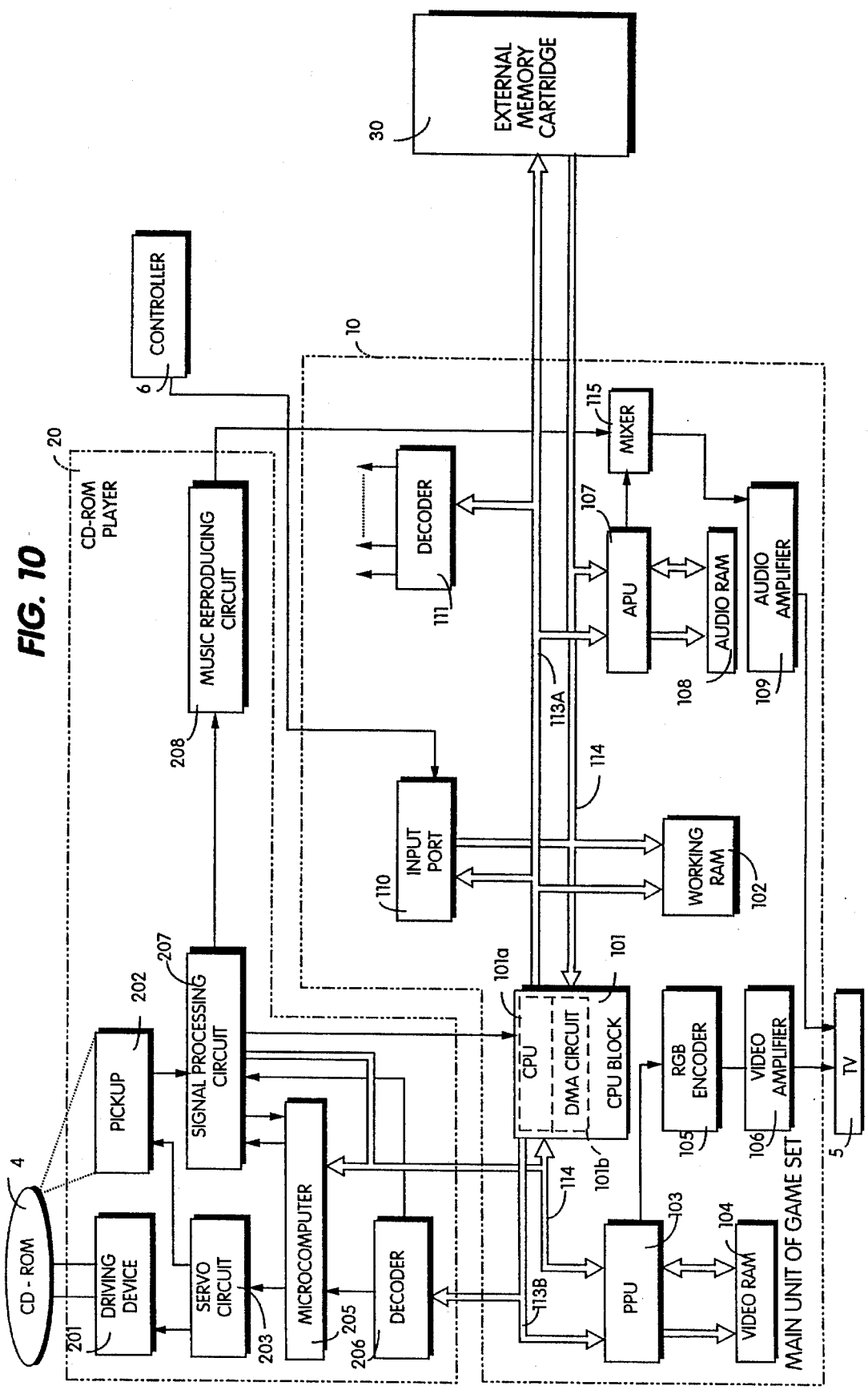
FIG. 10 is a block diagram showing the construction according to a second embodiment of the present invention.

FIG. 10 is a block diagram showing the construction according to another embodiment of the present invention. In FIG. 10, the data processing system according to the present embodiment comprises a game set 10 connected to a television receiver 5, a player 20 selectively connected to the game set 10, and a system ROM cartridge 30 detachably mounted on the game set 10.

The player 20 is for reading out recorded data from a CD-ROM 4, similarly to the player 2 shown in FIG. 1. In addition, the player 20 also has a function of performing collating processing for judging whether or not the recorded data in the CD-ROM 4 is unfairly copied data. Therefore, the player 20 is provided with a signal processing circuit 207 having a collating processing function in place of the signal processing circuit 204 shown in FIG. 1. In addition, a music reproducing circuit 208 is added to the player 20. This music reproducing circuit 208 includes a digital-to-analog converter and the like, and converts a digital sound signal applied from the signal processing circuit 207 into an analog sound signal. The other construction of the player 20 is the same as that of the player 2 shown in FIG. 1 and hence, corresponding portions are assigned the same reference numerals. Data shown in FIG. 4 are recorded on the CD-ROM 4. However, first collating music data 401 and game sound data 402 are recorded in such a manner that PCM data obtained by sampling the original analog sound signal and digitally coding the same is further EFM-modulated.

The game set 10 comprises a mixer 115. This mixer 115 mixes an analog sound signal outputted from an APU 107 with an analog sound signal applied from the music reproducing circuit 208 and outputs a signal obtained by the mixture to an audio amplifier 109. The game set 10 does not include the CIC 112 as shown in FIG. 1. The other construction of the game set 10 is the same as that of the game set shown in FIG. 1 and hence, corresponding portions are assigned the same reference numerals.

The external memory cartridge 30 comprises a program RAM 301 and a ROM 302, similarly to the external memory cartridge 3 shown in FIG. 1. However, the second collating music data 302b, the collating program data 302c, and the drive control program data 302d as shown in FIG. 5 are not stored in the ROM 302. In addition, the external memory cartridge 30 does not include the CIC 303 as shown in FIG. 1.

Figure 11:
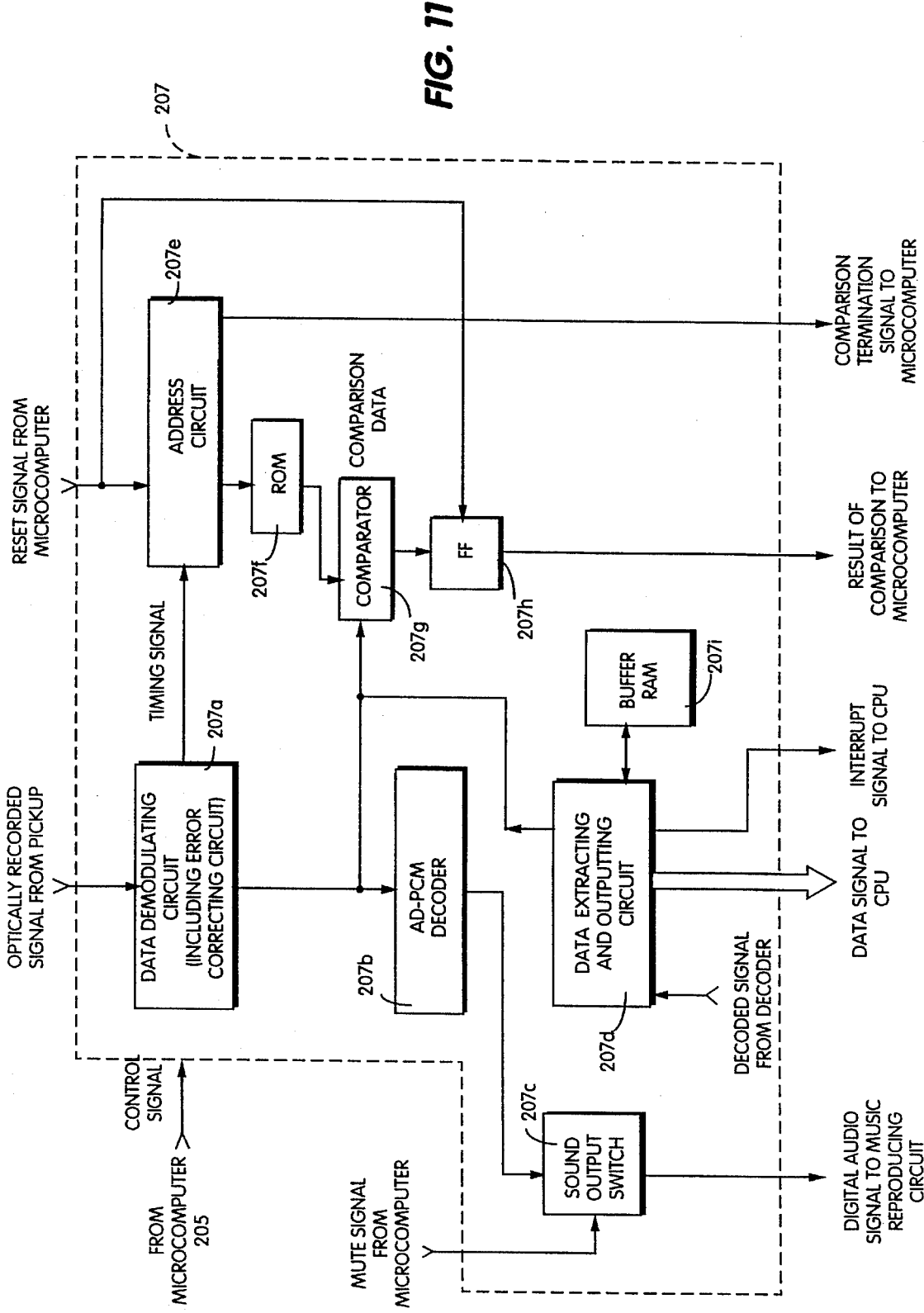
FIG. 11 is a block diagram showing the more detailed construction of a signal processing circuit shown in FIG. 10.

FIG. 11 is a block diagram showing the more detailed construction of the signal processing circuit 207 shown in FIG. 10. In FIG. 11, the signal processing circuit 207 comprises a data demodulating circuit 207a, an AD-PCM decoder 207b, a sound output switch 207c, a data extracting and outputting circuit 207d, an address circuit 207e, a ROM 207f, a comparator 207g, a flip-flop 207h, and a working RAM 207i.

The data demodulating circuit 207a demodulates data read from the CD-ROM 4 by a pickup 202, and corrects an error in the data. Demodulated data outputted from the data demodulating circuit 207a is applied to the AD-PCM decoder 207b, the data extracting and outputting circuit 207d, and the comparator 207g.

The AD-PCM decoder 207b performs expansion processing of the demodulated data applied (compressed PCM data), and outputs the PCM data after the expansion to the sound output switch 207c. A mute signal is applied to this sound output switch 207c from the microcomputer 205. On-off control of the sound output switch 207c is carried out by this mute signal. An output of the sound output switch 207c is applied to the music reproducing circuit 208.

The data extracting and outputting circuit 207d converts the format of the demodulated data, similarly to the data extracting and outputting circuit 204b shown in FIG. 2.

The above described data demodulating circuit 207a outputs one pulse to the address circuit 207e as a timing signal every time it outputs data of one byte. The address circuit 207e includes a counter, which is incremented for each pulse of the timing signal. A counted value of the address circuit 207e is applied to the ROM 207f as address data. This ROM 207f stores second collating music data. The second collating music data read out from the ROM 207f is applied to the comparator 207g. The comparator 207g compares the first collating music data applied from the data demodulating circuit 207a with the second collating music data applied from the ROM 207f, and brings the flip-flop 207h into a set state when both the data do not coincide with each other. An output signal of the flip-flop 207h is applied to the microcomputer 205 as a result of the comparison.

Meanwhile, the above described address circuit 207e outputs a carry signal when an overflow occurs in the counter included therein. This carry signal is applied to the microcomputer 205 as a comparison termination signal. The address circuit 207e and the flip-flop 207h are reset by a reset signal from the microcomputer 205 at the time of starting the system.

Figure 12:
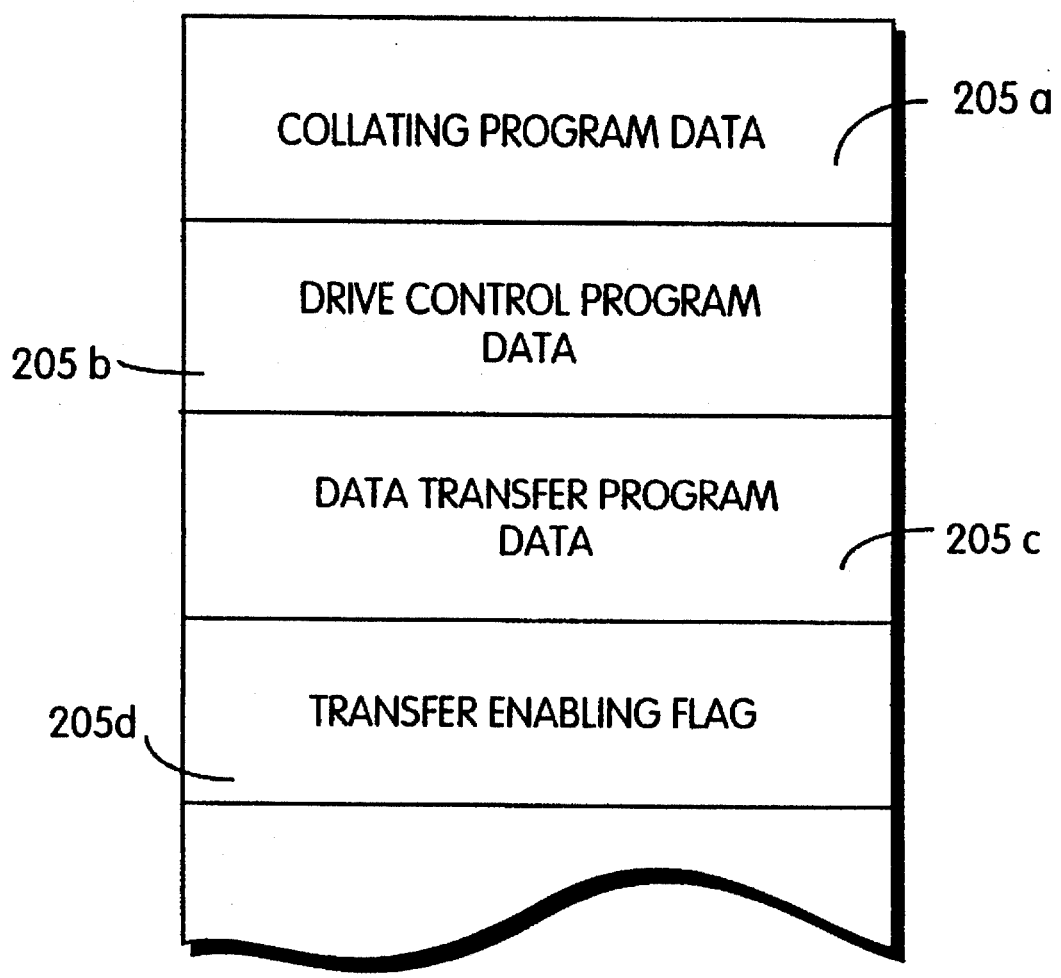
FIG. 12 is an illustration showing a memory map of an internal ROM contained in a microcomputer shown in FIG. 10.

FIG. 12 is an illustration showing a memory map of an internal ROM (not shown) included in the microcomputer 205 shown in FIG. 10. In FIG. 12, the internal ROM in the microcomputer 205 comprises collating program data 205a, drive control program data 205b, data transfer program data 205c, and a transfer enabling flag 205d.

Figure 13:
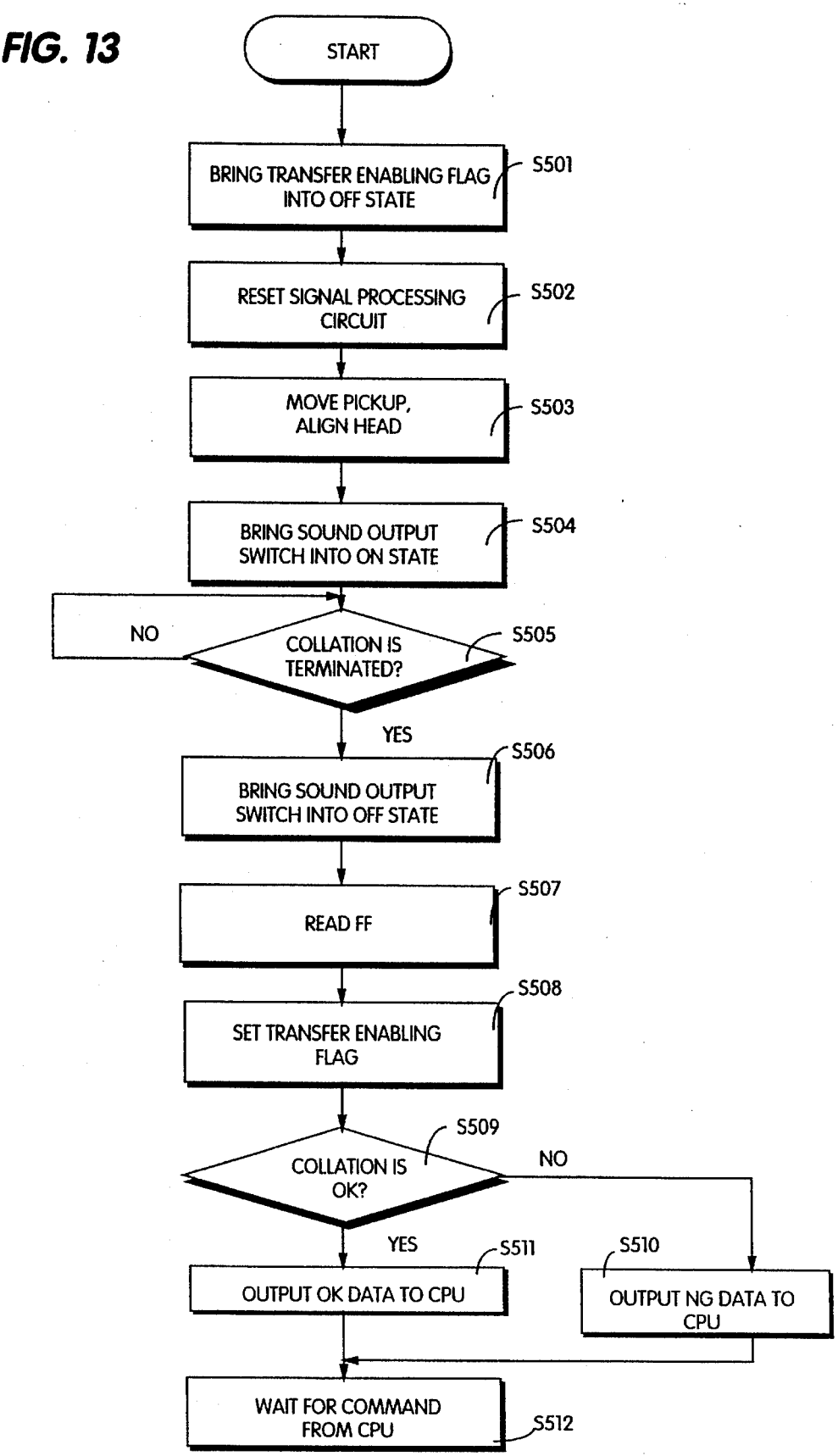
FIG. 13 is a flow chart showing operations performed by the microcomputer shown in FIG. 10 at the time of starting a system.
Figure 14:
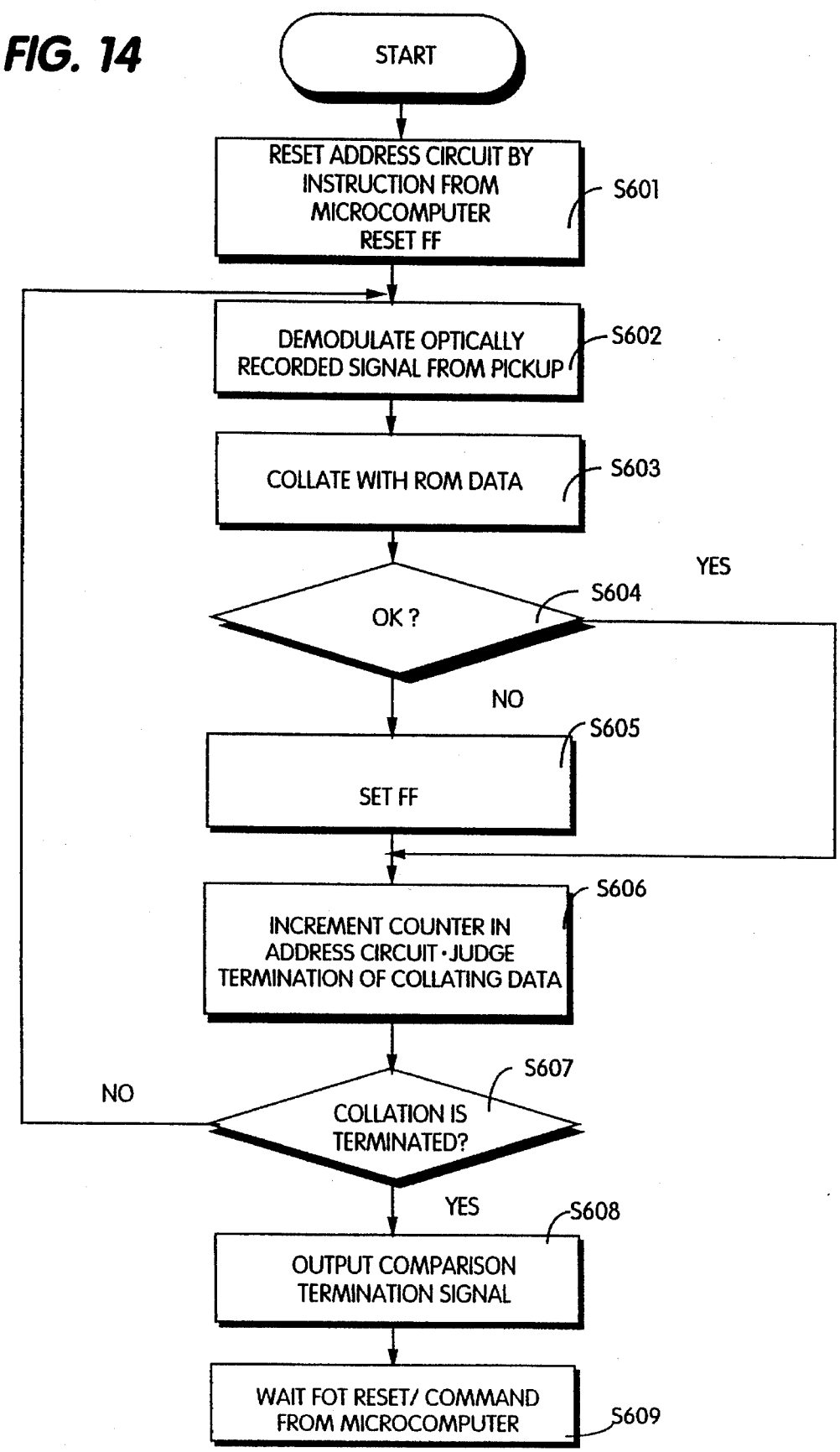
FIG. 14 is a flow chart showing operations performed by a signal processing circuit shown in FIG. 10 at the time of starting the system.
Figure 15:
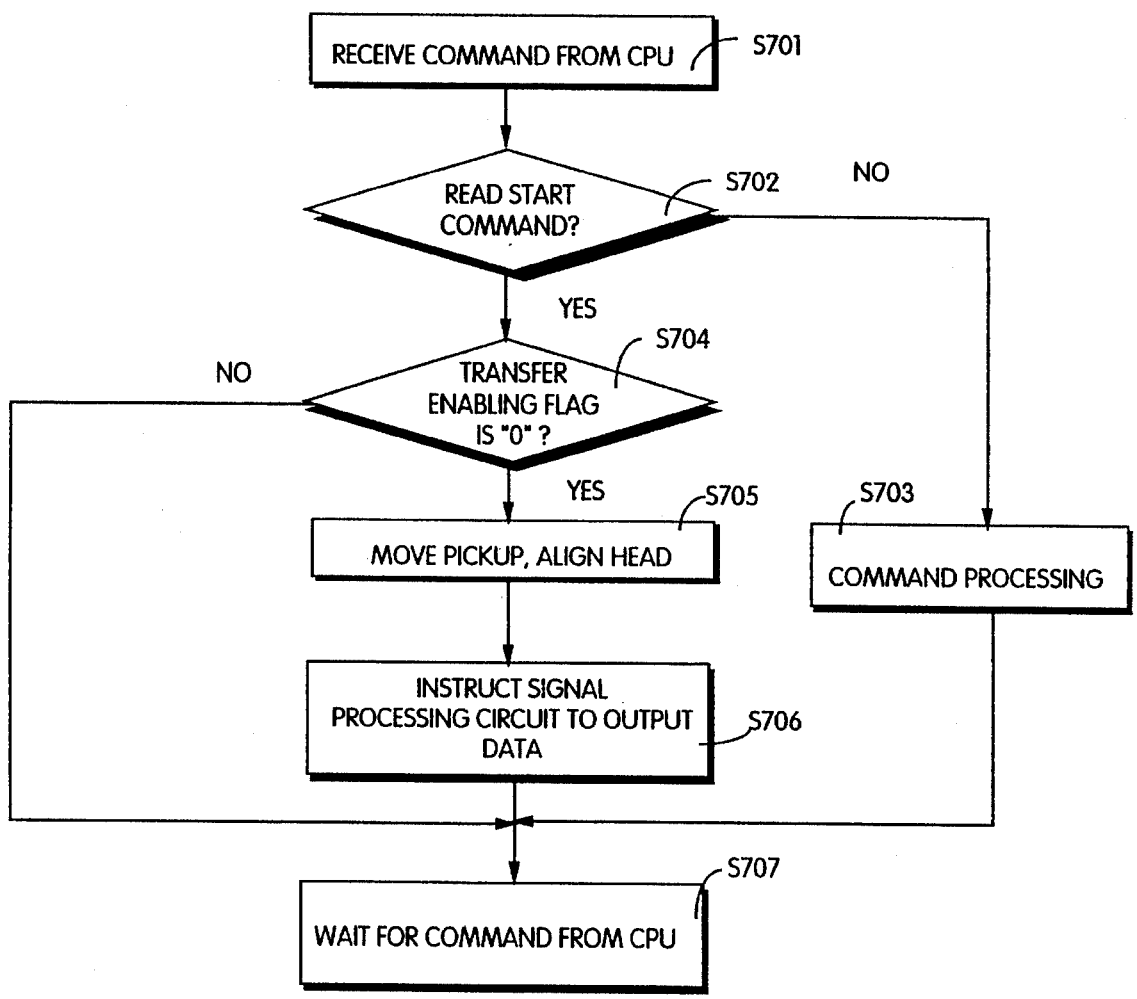
FIG. 15 is a flow chart showing operations performed by the microcomputer shown in FIG. 10 in receiving command data from a CPU.

FIG. 13 is a flow chart showing operations performed by the microcomputer 205 shown in FIG. 10 at the time of starting the data processing system. FIG. 14 is a flow chart showing operations performed by the signal processing circuit 207 shown in FIG. 10 at the time of starting the data processing system. FIG. 15 is a flow chart showing operations performed by the microcomputer 205 in receiving a command from a CPU 101a. Referring now to FIGS. 13 to 15, description is made of the operations according to the embodiment shown in FIGS. 10 and 11.

When the data processing system is started, the microcomputer 205 first brings the transfer enabling flag 205d (see FIG. 12) into an off state in the step S501 shown in FIG. 13. The program then proceeds to the step S502. In the step S502, the microcomputer 205 activates a reset signal to the signal processing circuit 207. The address circuit 207e and the flip-flop 207h in the signal processing circuit 207 are reset in response to the fact that the above described reset signal is activated (in the step S601 in FIG. 14). More specifically, the counted value of the counter in the address circuit 207e is cleared, so that a logic "0", for example, is set in the flip-flop 207h.

The program then proceeds to the step S503. In the step S503, the microcomputer 205 carries out movement control of the pickup 202 and alignment control of a reading head. Consequently, the pickup 202 is moved to a recording track on which the first collating music data is recorded in the CD-ROM 4. In addition, focusing control and tracking control for the reading head included in the pickup 202 are carried out.

By the operation shown in the above described step S503, the first collating music data read from the CD-ROM is outputted from the pickup 202. The first collating music data outputted from the pickup 202 is applied to the data demodulating circuit 207a in the signal processing circuit 207, to be demodulated therein (step S602 in FIG. 14).

The demodulated first collating music data is applied to the comparator 207g. At this time, the data demodulating circuit 207a outputs the first collating music data to the comparator 207g one byte at a time. On the other hand, the ROM 207f reads out the second collating music data of one byte from an address designated by the address circuit 207e, to output the same to the comparator 207g. Consequently, the comparator 207g compares the first collating music data of one byte with the second collating music data of one byte and collates both the data (step S603 in FIG. 14).

The comparator 207g outputs a signal having a logic "1" if it detects the noncoincidence of both the data as a result of the comparison and the collation, and brings the flip-flop 207h into a set state (a state where a logic "1" is set) (steps S604 and S605 in FIG. 14). On the other hand, the comparator 207g does not bring the flip-flop 207h into a set state if it detects the coincidence of both the data.

On the other hand, the first collating music data demodulated by the data demodulating circuit 207a is subjected to expansion processing in the AD-PCM decoder 207b and then, is applied to the sound output switch 207c. At this time, the microcomputer 205 brings the sound output switch 207c into an on state in the step S504. Consequently, the first collating music data is applied to the music reproducing circuit 208 through the sound output switch 207c, to be converted into an analog sound signal therein. The first collating music data converted into the analog sound signal is applied to the audio amplifier 109 through the mixer 115, to be current-amplified therein and then, is outputted to a television receiver 5. Consequently, first collating music is outputted as a sound from the television receiver 5.

When the data demodulating circuit 207a outputs one pulse signal to the address circuit 207e after the first collating music data of the first one byte has been outputted. Accordingly, a counted value of the counter in the address circuit 207e is incremented, so that an address for the ROM 207f is updated by one (step S606 in FIG. 14). Consequently, the second collating music data of one byte representing the subsequent address is read out from the ROM 207f. On the other hand, the data demodulating circuit 207a demodulates the first collating music data of the second byte and outputs the same. Consequently, in the comparator 207g, the first collating music data of the second byte and the second collating music data of the second byte are compared with each other and collated. In the same manner, the first collating music data and the second collating music data are compared with each other and collated sequentially by byte.

When the comparison and collating processing of the collating music data of the final byte is terminated in the comparator 207g (step S607 in FIG. 14), an overflow occurs in the address circuit 207e in response to a pulse signal from the data demodulating circuit 207a, to generate a carry signal. This carry signal is applied to the microcomputer 205 as a comparison termination signal (step S608 in FIG. 14). Thereafter, the signal processing circuit 207 enters the wait state of the subsequent reset signal or command data from the microcomputer 205 (step S608 in FIG. 14).

On the other hand, the microcomputer 205 judges the termination of the collating processing upon receipt of the carry signal, that is, the comparison termination signal from the address circuit 207e (step S505). The microcomputer 205 then brings the sound output switch 207c into an off state in the step S506. Consequently, the supply of the second collating music signal to the television receiver 5 is stopped.

The program then proceeds to the step S507. In the step S507, the microcomputer 205 reads an output signal of the flip-flop 207h. At this time, the logic state of the output signal of the flip-flop 207h is determined by the result of the collation in the comparator 207g. Specifically, when the comparator 207g detects the noncoincidence of the first and second collating music data of at least one byte, the logic of the output signal of the flip-flop 207h becomes "1". On the other hand, when the comparator 207g detects the coincidence of the first and second collating music data of all bytes, the logic of the output signal of the flip-flop 207h becomes "0". Consequently, the microcomputer 205 reads the output signal of the flip-flop 207h, thereby to make it possible to recognize the result of the collation of the first and second collating music data.

The program then proceeds to the step S508. In the step S508, the microcomputer 205 sets the transfer enabling flag 205d (see FIG. 12) on the basis of the logic state of the output signal read from the flip-flop 207h. Specifically, when the logic of the output signal of the flip-flop 207h is "1", a logic "1" is set in the transfer enabling flag 205d. On the other hand, when the logic of the output signal of the flip-flop 207h is "0", a logic "0" is set in the transfer enabling flag 205d.

The program then proceeds to the step S509. In the step S509, the microcomputer 205 judges whether or not the first and second collating music data coincide with each other as a result of the collation. This judgment is made on the basis of the logic set in the transfer enabling flag 205d. Specifically, when the logic "1" is set in the transfer enabling flag 205d, the microcomputer 205 judges that the result of the collation is noncoincidence, to output to the CPU 101a data indicating that the result of collation is noncoincidence (step S510). On the other hand, when the logic "0" is set in the transfer enabling flag 205d, the microcomputer 205 judges that the result of the collation is coincidence, to output to the CPU 101a data indicating that the result of collation is coincidence (step S511).

After the operation in the above described step S510 or S511, the program proceeds to the step S512. In the step S512, the microcomputer waits for the subsequent command data from the CPU 101a.

Referring now to FIG. 15, description is made of operations performed by the microcomputer 205 in receiving the command data from the CPU 101a.

When in the step S701, the microcomputer 205 receives the command data from the CPU 101a, the program then proceeds to the step S702. In the step S702, the microcomputer 205 judges whether or not the received command data is read start command data. If the received command data is not read start command data, the microcomputer 205 executes corresponding command processing in the step S703 and then, the program proceeds to the step S707. In the step S707, the microcomputer 205 waits for the subsequent command data from the CPU 101a.

On the other hand, if the received command data is read start command data, the program proceeds to the step S704. In the step S704, the microcomputer 205 judges whether or not the logic "0" is set in the transfer enabling flag 205d. If the logic "0" is set in the transfer enabling flag 205d, the program proceeds to the step S705. In the step S705, the microcomputer 205 moves the pickup 202 and aligns the reading head. Consequently, the pickup 202 reads out predetermined data (for example, the game program data 404: see FIG. 4) from the CD-ROM 4.

The program then proceeds to the step S706. In the step S706, the microcomputer 205 instructs the signal processing circuit 207 to output data. Consequently, the signal processing circuit 207 demodulates the data read out by the pickup 202 and outputs the same to the game set 10. Correspondingly, the execution of a game program is started in the CPU 101a. An operation of transferring data from the signal processing circuit 207 to the game set 10 are the same as that shown in FIGS. 7 and 8. The microcomputer 205 then proceeds to the step S707. In the step S707, the microcomputer 205 waits for the subsequent command data from the CPU 101a.

On the other hand, when the logic "1" is set in the transfer enabling flag 205d, that is, the result of the collation is noncoincidence, the microcomputer 205 does not perform the operations in the steps S705 and S706 but directly performs the operation in the step S707. Consequently, when the result of the collation is noncoincidence, the game program data is not supplied to the game set 10. When unfairly copied data is recorded on the CD-ROM 4, therefore, the use thereof is inhibited.

As described in the foregoing, according to the present embodiment, it is possible to reliably inhibit the use of an unfair optical information recording medium imitated on which no predetermined music data is recorded.

Furthermore, music information is used as collating data, thereby to make it possible to perform collating processing with a small amount of data and at high speed.

Additionally, even when collating music data itself is unfairly copied, it is possible to exclude the use of the optical information recording medium on which such unfairly copied data is recorded as an infringement of the music copyright.

Moreover, a ROM 302 for storing the second collating music data and the collating program data is provided outside of the main unit. Accordingly, the present invention is applicable to a game apparatus storing no second collating music data and collating program data.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

A data processing system according to the present invention is suitable for a television game system according to the above described embodiments, a data processing system used for education, and a data processing system (for example, a personal computer system) used for general purposes.

What is claimed is:

1. A data processing system, provided for a monitor device for displaying an image upon receipt of an image signal and outputting a sound upon receipt of a sound signal, for executing predetermined collating processing at the time of starting the system and judging the adaptability of an optical information recording medium serving as an external memory, comprising:

an optical information recording medium on which at least first collating music data, sound data, and image data are recorded;

optical reproducing apparatus for reading out the respective recorded data from said optical information recording medium;

a collating music data memory for storing second collating music data having a predetermined relationship with said first collating music data;

a collating program memory for storing collating program data;

image/sound processing program memories for storing image/sound processing program data for image processing and sound processing;

image/sound processing program processors for executing the image/sound processing program data stored in said image/sound processing program memories to generate a sound signal and an image signal based on said sound data and said image data recorded on said optical information recording medium and apply the signals to said monitor device;

a collating program processor for executing said collating program data stored in said collating program memory at the time of starting the system, to collate said first collating music data read out from said optical information recording medium by said optical reproducing apparatus and said second collating music data stored in said collating music data memory to judge whether or not both the data have the predetermined relationship and allow an operation based on said image/sound processing program data by said image/sound processing program processors only when both the data have the predetermined relationship; and a sound signal generator for generating a collating music signal on the basis of said first collating music data read out by said optical reproducing apparatus and applying said music signal to said monitor device at the time of starting the system.

2. The data processing system according to claim 1, wherein said image/sound processing program processor, said collating program processor, and said collating music signal generator are arranged in a main unit connected to said monitor device, said second collating music data memory and said collating program data memory are arranged in an external memory cartridge detachably mounted on said main unit, and said optical reproducing apparatus is arranged in a player which is selectively connected to said main unit, and on which said optical information recording medium is detachably mounted.

3. The data processing system according to claim 1, further comprising rewritable memory for temporarily storing at least the sound data and the image data read out from said optical information recording medium by said optical reproducing apparatus, and wherein said image/sound processing program processors transfer the sound data and the image data read out from said optical information recording medium by said optical reproducing apparatus to said rewritable memory and writes the data thereto in parallel with the collation of the first collating music data and the second collating music data by said collating program processor, and said collating program processor inhibits said image/sound processing program processor from writing the sound data and the image data to said rewritable memory when it judges that said first collating music data and said second collating music data do not have the predetermined relationship.

4. The data processing system according to claim 3, wherein said optical information recording medium has a much larger storage capacity than the storage capacity of said rewritable memory, and said collating program processor inhibits said sound data and said image data from being transferred to said rewritable memory after it judges that the first collating music data and the second collating music data do not have the predetermined relationship.

5. The data processing system according to claim 1, wherein said sound signal generator continuously generates said collating music signal to apply the signal to said monitor device until the collating processing in said collating program processor is terminated.

6. The data processing system according to claim 1, wherein said sound signal generator and said image/sound processing program processors are arranged in a main unit connected to said monitor device, and said optical reproducing apparatus, said second collating music data memory, said collating program data memory, and said collating program processor are arranged in the player which is selectively connected to said main unit, and on which said optical information recording medium is detachably mounted.

7. The data processing system according to claim 1, wherein said data processing system is constructed as a video game apparatus, and said image/sound processing program memories store an image processing program for displaying a game image and a sound processing program for generating a game sound.

8. A data processing system, provided for a monitor device for displaying an image upon receipt of an image signal and outputting a sound upon receipt of a sound signal, for executing predetermined collating processing at the time of starting the system and judging the adaptability of an optical information recording medium serving as an external memory, comprising:

an optical information recording medium on which at least first collating music data, sound data, and image data are recorded;

optical reproducing means for reading out the respective recorded data from said optical information recording medium;

second collating music data storing means for storing second collating music data having a predetermined relationship with said first collating music data;

a collating program storing means for storing collating program data;

image/sound processing program storing means for storing image/sound processing program data for image processing and sound processing;

image/sound processing program executing means for executing the image/sound processing program data stored in said image/sound processing program storing means to generate a sound signal and an image signal based on said sound data and said image data recorded on said optical information recording medium and apply the signals to said monitor device;

collating program executing means for executing said collating program data stored in said collating program storing means at the time of starting the system, to collate said first collating music data read out from said optical information recording medium by said optical reproducing means and said second collating music data stored in said second collating music data storing means to judge whether or not both the data have the predetermined relationship and allow an operation based on said image/sound processing program data by said image/sound processing program executing means only when both the data have the predetermined relationship;

sound signal generating means for generating a collating music signal on the basis of said first collating music data read out by said optical reproducing means and applying said music signal to said monitor device at the time of starting the system;

rewritable storing means for temporarily storing at least the sound data and the image data read out from said optical information recording medium by said optical reproducing means;

said image/sound processing program executing means transfers the sound data and the image data read out from said optical information recording medium by said optical reproducing means to said rewritable storing means and writes the data thereto in parallel with the collation of the first collating music data and the second collating music data by said collating program executing means;

said collating program executing means inhibits said image/sound processing program executing means from writing the sound data and the image data to said rewritable storing means when it judges that said first collating music data and said second collating music data do not have the predetermined relationship;

said optical information recording medium has a much larger storage capacity than the storage capacity of said rewritable storing means; and said collating program executing means inhibits said sound data and said image data from being transferred to said rewritable storing means after it judges that the first collating music data and the second collating music data do not have the predetermined relationship.

9. The data processing system according to claim 8, wherein said sound signal generating means and said image/sound processing program executing means are arranged in a main unit connected to said monitor device, and said optical reproducing means, said second collating music data storing means, said collating program data storing means, and said collating program executing means are arranged in the player which is selectively connected to said main unit, and on which said optical information recording medium is detachably mounted.

10. The data processing system according to claim 8, wherein said image/sound processing program executing means, said collating program executing means, and said collating music signal generating means are arranged in a main unit connected to said monitor device, said second collating music data storing means and said collating program data storing means are arranged in an external memory cartridge detachably mounted on said main unit, and said optical reproducing means is arranged in a player which is selectively connected to said main unit, and on which said optical information recording medium is detachably mounted.

* * * * *